(12) United States Patent
Jordan

(10) Patent No.: US 7,151,326 B2
(45) Date of Patent: Dec. 19, 2006

(54) SYSTEM AND METHOD FOR SAFELY AND EFFICIENTLY CAPTURING POWER CURRENTLY PRODUCED BY ALREADY AVAILABLE POWER SUPPLIES TO POWER ELECTRICAL DEVICES IN A TRUCK WHILE ITS ENGINE IS TURNED OFF

(75) Inventor: Robert Howard Jordan, Juneau, WI (US)

(73) Assignee: Idle Free Systems, L.L.C., Juneau, WI (US)

( * ) Notice: Subject to any disclaimer, the term of this patent is extended or adjusted under 35 U.S.C. 154(b) by 471 days.

(21) Appl. No.: 10/668,618

(22) Filed: Sep. 23, 2003

(65) Prior Publication Data

US 2005/0063121 A1    Mar. 24, 2005

(51) Int. Cl.
*H02J 3/02* (2006.01)
*H02J 3/38* (2006.01)
*B60L 1/10* (2006.01)
*B60L 1/14* (2006.01)
*H02J 7/00* (2006.01)

(52) U.S. Cl. .......................... 307/22; 307/9.1; 307/19; 307/20; 307/21; 307/23; 307/25; 307/44; 307/46; 307/65; 320/103; 320/104

(58) Field of Classification Search ............ 307/19–23, 307/25, 44–46, 9.1, 10.1, 10.6, 10.8, 26, 307/29, 64–66, 80, 81, 86, 126; 320/103, 320/104, 112; 439/133, 367, 449
See application file for complete search history.

(56) References Cited

U.S. PATENT DOCUMENTS

| | | | |
|---|---|---|---|
| 2,962,873 A | 12/1960 | Anderson | 62/180 |
| 3,475,919 A | 11/1969 | Ellis | 62/228.1 |
| 4,280,330 A | 7/1981 | Harris et al. | 62/3.3 |
| 4,308,994 A | 1/1982 | Perhats | 237/12.3 B |
| 4,448,157 A | 5/1984 | Eckstein et al. | 123/142.5 R |
| 4,531,379 A | 7/1985 | Diefenthaler, Jr. | 62/236 |
| 4,682,649 A | 7/1987 | Greer | 165/43 |

(Continued)

FOREIGN PATENT DOCUMENTS

DE    3933040    4/1991

(Continued)

OTHER PUBLICATIONS

IdleAire.com, Web site pages download on Dec. 18, 2002; description of idle Aire's no-idle system for trucks.

(Continued)

*Primary Examiner*—Stephen W. Jackson
*Assistant Examiner*—Hal I. Kaplan
(74) *Attorney, Agent, or Firm*—Patricia Smith King

(57) ABSTRACT

The present invention is directed to an electrical system and method for providing power to a truck's cab while the truck's engine is turned off. An already available primary power supply of the truck and a secondary power supply generally located on a trailer being hauled by the truck, are used to charge auxiliary power storage units. The secondary power supply is further used to maintain charge of the auxiliary power storage units while the truck's engine is off. The system may provide power to electrical devices within the truck as DC, or as AC by means of an inverter. The system may further include thermostatic controls to protect the secondary power supply when high-voltage electrical devices such as space heaters are being used. Separate operating circuits are employed that include switching means to enable an operator to, or to automatically, control operation of the system.

16 Claims, 4 Drawing Sheets

U.S. PATENT DOCUMENTS

| | | | |
|---|---|---|---|
| 4,732,229 A | 3/1988 | Lucht | 180/69.6 |
| 4,756,359 A | 7/1988 | Greer | 165/43 |
| 4,780,618 A | 10/1988 | Wareman et al. | 307/9.1 |
| 4,874,921 A | 10/1989 | Gerbig, Jr. | 219/202 |
| 4,909,044 A | 3/1990 | Gudmundsen | 62/236 |
| 4,939,911 A | 7/1990 | Mandell | 62/239 |
| 5,067,652 A | 11/1991 | Enander | 237/81 |
| 5,333,678 A | 8/1994 | Mellum et al. | 165/42 |
| 5,528,901 A | 6/1996 | Willis | 60/626 |
| 5,896,750 A | 4/1999 | Karl | 62/236 |
| 5,899,081 A | 5/1999 | Evans et al. | 62/126 |
| 5,901,572 A | 5/1999 | Peiffer et al. | 62/480 |
| 5,927,269 A | 7/1999 | Quarrie | 431/168 |
| 6,116,513 A | 9/2000 | Perhats, Sr. | 237/2 A |
| 6,453,678 B1 | 9/2002 | Sundhar | 62/3.2 |
| 2001/0025889 A1 | 10/2001 | Salberg | 237/12.1 |
| 2002/0014329 A1 | 2/2002 | Carr | 165/201 |

FOREIGN PATENT DOCUMENTS

| | | |
|---|---|---|
| JP | 401153321 | 6/1989 |

OTHER PUBLICATIONS

Caterpillar.com, Web site pages downloaded on Dec. 18, 2002; description of MorElectric no-idle system.

Auxgenerators.com, Web site pages downloaded on Dec. 18, 2002; description of auxiliary power supplies for trucks.

Proheat.com, Web site pages downloaded on Dec. 18, 2002; decription of heater/auxilary power unit made by Teleflex.

Rigmasterpower.com, Web site pages downloaded Dec. 18, 2002; description of standalone truck mounted generator sets.

Ponypack.com, Web site pages downloaded Dec. 18, 2002; description of Pony Pack's auxiliary power unit for diesel trucks.

Truckgen.com, Web site pages downloaded Dec. 18, 2002; description of Truck Gen's mini auxiliary power unit system.

Ulti-max.com, Web site pages downloaded Dec. 13, 2002; description of Ulti Max's stand-alone generator for trucks.

Espar.com, Web site pages downloaded Dec. 13, 2002; description of heater for trucks.

SYSTEM AND METHOD FOR SAFELY AND EFFICIENTLY CAPTURING POWER CURRENTLY PRODUCED BY ALREADY AVAILABLE POWER SUPPLIES TO POWER ELECTRICAL DEVICES IN A TRUCK WHILE ITS ENGINE IS TURNED OFF

CROSS-REFERENCES

Not applicable.

STATEMENT REGARDING FEDERALLY SPONSORED RESEARCH OR DEVELOPMENT

Not applicable.

BACKGROUND

Current legal and economic trends have led to the requirement that the time over which a semi-truck's engine idles be minimized. This has given rise to the need for a system to provide power to a truck's cab while the truck's engine is turned off in order to enable its heating and cooling and to run other electrical devices.

Laws which prohibit idling while a truck is stopped off-road are being implemented in an ever increasing number of municipalities. Further regulations are being implemented that increase the total time a driver is required to remain off-road in any given 24-hour period. High fuel prices further motivate drivers to minimize idling time in order to conserve fuel. In addition environmental regulations are being implemented to minimize air pollution associated with the combustion of diesel fuels during idling.

All of these trends lead to little to no allowable idling time. Less idling time, means a driver spends greater amounts of time with the truck's engine turned off and with the subsequent elimination of the truck's battery as a power supply to the truck's cab. A truck's battery cannot normally supply enough energy while the truck's engine is turned off, to power electrical devices within the cab for very long before its charge is depleted. The trends to minimize idling of truck engines have therefore created the need to provide drivers with alternative means of powering electrical devices within their cabs while the truck engines are turned off for long periods of time. Heating and cooling are especially essential to drivers who must pass many hours off-road in hot or cold weather conditions. In addition, electrical power is also required to run other electrical devices such as lights, fans, cooking appliances, chargers for cell phones, computers, radios and televisions.

For the foregoing reasons, there is a need to provide an efficient, safe and simple system for powering electrical devices in a truck's cab while the truck's engine is turned off.

Information relevant to attempts to address these problems can be found in U.S. Pat. No. 2,962,873 to Anderson; U.S. Pat. No. 3,475,919 to Ellis; U.S. Pat. No. 4,280,330 to Harris, et al.; U.S. Pat. No. 4,308,994 to Perhats; U.S. Pat. No. 4,448,157 to Eckstein, et al.; U.S. Pat. No. 4,531,379 to Diefenthaler, Jr.; U.S. Pat. No. 4,682,642 to Greer; U.S. Pat. No. 4,732,229 to Lucht; U.S. Pat. No. 4,756,359 to Greer; U.S. Pat. No. 4,780,618 to Wareman, et al.; U.S. Pat. No. 4,874,921 to Gerbig; U.S. Pat. No. 4,909,044 to Gudmundsen; U.S. Pat. No. 4,939,911 to Mandell; U.S. Pat. No. 5,067,652 to Enander; U.S. Pat. No. 5,333,678 to Mellum, et al.; U.S. Pat. No. 5,528,901 to Willis; U.S. Pat. No. 5,896,750 to Karl; U.S. Pat. No. 5,899,081 to Evans, et al.; U.S. Pat. No. 5,901,572 to Peiffer; U.S. Pat. No. 5,927,269 to Quarrie; U.S. Pat. No. 6,116,513 to Perhats, Sr.; and, U.S. Pat. No. 6,453,678 to Sundhar; U.S. published patent application Nos. 2001/0025889 to Salberg; 2002/0014329 to Carr; Japanese Patent No. JP401153321 to Takehana, et al.; and, German Patent No. DE3933040 to Steinbeck. However, each one of these references suffers from one or more of the following disadvantages: they utilize a secondary power supply, but without employing power storage means sufficient to run electrical devices for long periods of time to meet a driver's heating or cooling needs while off-road; they provide power storage means but without the ability to maintain their charge, thus failing to enable long term provision of power to electrical devices; they provide alternative power supplies that require additional fuel, rather than conserving fuel; and/or, they are intended for non-diesel engines and so fail to work when applied to large truck systems.

For the foregoing reasons, there is a need for an efficient, safe and simple system for the long-term provision of ample power to a truck's cab while the truck's engine is turned off.

SUMMARY

The present invention is directed to an electrical system and method for employing same that satisfies this need for an efficient, cost-effective and simple means of providing ample power to a truck's cab while the truck's engine is turned off for long periods of time. An electrical system having features of the present invention consists of a system for using already available primary and secondary power supplies to charge an auxiliary power storage means and for maintaining charge of the auxiliary power storage means by utilizing the secondary power supply. The system is thus able to power one or more electrical devices while a truck's engine is turned off.

In overview, the system comprises a primary power supply consisting of an alternator and an at least one battery of the truck, an auxiliary power storage means and a secondary power supply.

A first operating circuit connects the primary power supply to the auxiliary power storage means and consists of a first switching means for actuating the first operating circuit and for enabling an operator to, or to automatically, selectively close the first operating circuit and to direct power from the primary power supply to charge one or more power storage units of the auxiliary power storage means while the truck's engine is turned on.

A second operating circuit connects the secondary power supply to the auxiliary power storage means and consist of a first circuit breaker for distributing load so as to minimize stress on the secondary power supply and a second switching means for actuating the second operating circuit and for enabling the operator to, or to automatically, selectively close the second operating circuit and direct power from the secondary power supply to charge the one or more power storage units of the auxiliary power storage means when the truck's engine is turned off. The second circuit may optionally also include a thermostat switch to enable use of high-voltage electrical devices such as space heaters without damage to the secondary power supply.

A third operating circuit connects the auxiliary power storage means to an at least one electrical outlet in the truck and consists of one or more electrical outlets into which electrical devices may be plugged; and, a third switching means for enabling the operator to, or to automatically, selectively close the third operating circuit and direct power from the auxiliary power storage means to the at least one electrical outlet. The third circuit may optionally also include an inverter for supplying alternating current (AC) to the electrical outlet and which may further enable use of external AC power supplies to charge the auxiliary power storage units and to power electrical devices.

The system thus enables the charging of the auxiliary power storage means using the already available primary and secondary power supplies and while the truck's engine is turned on and the maintaining of the charge of the auxiliary power storage means by using the secondary power supply when the truck's engine is turned off. In this way the electrical devices may be run on power stored in the one auxiliary power storage units over an extended period of time while the truck is turned off without depleting the auxiliary power storage units and while minimizing stress on the secondary power supply. An operator may thus rely on the system to provide ample power to electrical devices which heat or cool the truck, among others such as lights, stoves, radios, computers and televisions, while the operator sleeps or otherwise spends time in the truck while off-road without the need to run the truck's engine.

A method for employing the system of the present invention is further provided.

Several objects and advantages of the present invention are:

means by which already produced power may be safely and efficiently captured for use to power electrical devices in a truck while the truck's engine is turned off, to enable a driver to heat and cool the truck's cab and bunk areas and to run other electrical appliances while simultaneously conserving fuel, decreasing pollution (including noise and exhaust), decreasing engine wear, and saving money;

means by which power already being produced by a truck's primary power supply may be captured and stored in an auxiliary power storage device while the truck's engine is turned on, for later use to power electrical devices in the truck while the truck's engine is turned off;

means by which power already being produced by a secondary power supply on a trailer being hauled by the truck may be safely captured and stored in an auxiliary power storage device while the truck's engine is on or off, for later use to power electrical devices in the truck while the truck's engine is turned off;

means by which a secondary power supply may be safely used to maintain charge of an auxiliary power storage device over extended periods of time while the truck's engine is turned off, regardless of current draw by electrical devices in the truck, eliminating the need for large battery banks and thus reducing the weight of the auxiliary power storage device needed; and, means by which the power from the auxiliary power storage device may optionally be provided in alternating current to power electrical devices in the truck, to enable a driver to use electrical devices that are more readily available and cheaper than those that run on direct current.

The reader is advised that this summary is not meant to be exhaustive. Further features, aspects, and advantages of the present invention will become better understood with reference to the following description, accompanying drawings and appended claims.

BRIEF DESCRIPTION OF DRAWINGS

For a better understanding of the present invention, reference may be made to the accompanying drawings, in which.

DESCRIPTION

Figure 1:
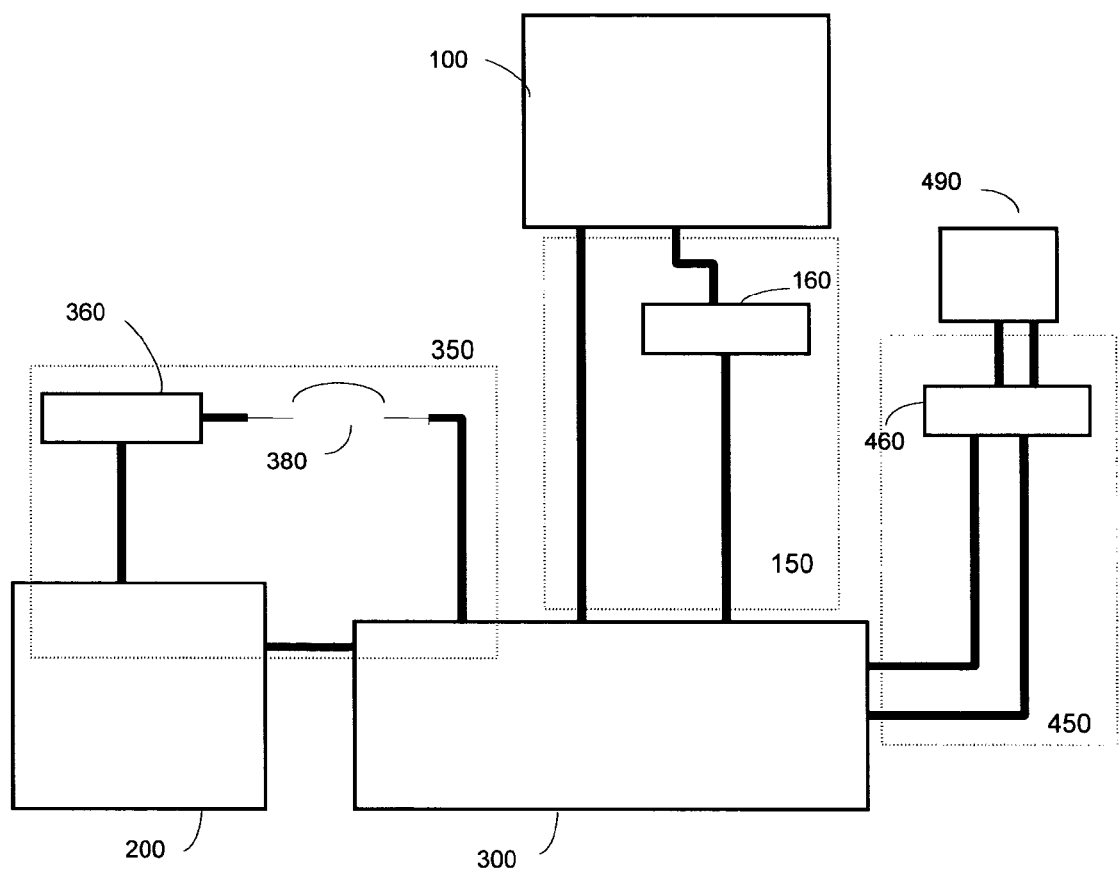
FIG. 1, shows a schematic diagram depicting the basic circuits of a version of the electrical system of the present invention in overview.

Referring now specifically to the figures, in which identical or similar parts are designated by the same reference numerals throughout, a detailed description of the present invention is given. It should be understood that the following detailed description relates to the best presently known embodiment of the invention. However, the present invention can assume numerous other embodiments, as will become apparent to those skilled in the art, without departing from the appended claims.

It should also be understood that, while the methods disclosed herein may be described and shown with reference to particular steps performed in a particular order, these steps may be combined, sub-divided, or re-ordered to form an equivalent method without departing from the teachings of the present invention. Accordingly, unless specifically indicated herein, the order and grouping of the steps is not a limitation of the present invention.

It should further be understood that applicant intends to encompass within the language used in this description for a given structure, any structure presently existing or developed in the future that performs the same function.

The System

Overview. Referring to FIG. 1, the general circuitry of the present invention is depicted. The system provides a means for safely and efficiently capturing power that is currently being produced by a truck's engine (a primary power supply 100) and also by a secondary power supply 200 located on a trailer being hauled by the truck, and storing that power in an auxiliary power storage device 300. The system further provides a means for maintaining charge of the auxiliary power storage device 300 on a truck, while the truck is turned off, by utilizing the secondary power supply 200. The auxiliary power storage device 300 may then be utilized to power one or more electrical devices while a truck's engine is turned off over extended periods of time during which its charge is maintained by means of the secondary power supply 200.

As can be seen in FIG. 1, the system generally consists of three electrical operating circuits 150, 350 and 450. The first operating circuit 150 electrically connects the primary power supply 100 to the auxiliary power storage device 300. The second operating circuit 350 electrically connects the secondary power supply 200 to the auxiliary power storage device 300. The third operating circuit 450 electrically connects one or more electrical outlets 490 to the auxiliary power storage device 300.

The primary power supply 100 consists of an alternator 120 and an at least one battery 130 of the truck. The secondary power supply 200 generally consists of a battery 230 and an alternator 220 (see FIGS. 2 and 3).

The first operating circuit 150 consists of a first switching mechanism 160 for actuating the first operating circuit 150 and for enabling an operator to, or to automatically, selectively close the first operating circuit 150 and to direct power from the primary power supply 100 to charge one or more power storage units 310 of the auxiliary power storage device 300 while the truck's engine is turned on.

A second operating circuit 350 consists of a first circuit breaker 380 as one means of distributing load so as to minimize stress on the secondary power supply 200 (particularly given that the alternator 220 of the secondary power supply 200 is often significantly smaller than the alternator 120 of the truck) and a second switching mechanism 360 for actuating the second operating circuit 350 and for enabling the operator to, or to automatically, selectively close the second operating circuit 350 and direct power from the secondary power supply 200 to charge the one or more power storage units 310 of the auxiliary power storage device 300 when the truck's engine is turned on or off.

A third operating circuit 450 connects the auxiliary power storage device 300 to an at least one electrical outlet 490 in the truck and consists of one or more electrical outlets 490 into which electrical devices may be plugged; and, a third switching means 460 for enabling the operator to, or to automatically, selectively close the third operating circuit 450 and direct power from the auxiliary power storage device 300 to the at least one electrical outlet.

The system thus enables the charging of the auxiliary power storage device 300 using the primary power supply 100, and optionally also the secondary power supply 200, while the truck's engine is turned on and the maintaining of the charge of the auxiliary power storage device 300 by using the secondary power supply 200 when the truck's engine is turned off. In this way the electrical devices 600 may be run on power stored in the auxiliary power storage device 300 over an extended period of time while the truck is turned off without depleting charge of the auxiliary power storage units 310 and while minimizing stress on the secondary power supply 200. An operator may thus rely on the system to provide ample power to electrical devices 600 which heat or cool the truck, power cooking equipment, computers, lights and many other electrical devices, while the operator sleeps or otherwise spends time in the truck while off-road without the need to run the truck's engine.

The system is thus an elegant means of capturing energy that is already being produced by the primary and secondary power supplies 100 and 200 to power electrical devices 600 without the need to idle the truck's engine while off-road. The system of the present invention thus conserves energy and minimizes pollution while providing power to electrical devices 600 in a truck. The system also saves money in that by not idling the truck's engine, truck fuel costs are lower. Also, by utilizing a secondary power supply 200 on a trailer, such as a refrigerated unit which is already running to maintain conditions in the trailer, little extra fuel is required to additionally maintain charge of the auxiliary power storage units. Additionally, any extra fuel required to run the secondary power supply 200, costs a driver less than the truck's fuel as it is "off-road" and taxed at a much lower rate than "on-road" fuel (which includes a significant road tax, currently $0.31 per gallon in Wisconsin).

Primary power supply 100. The primary power supply 100 will generally comprise a truck's alternator 120 and one or more batteries 130 (see FIGS. 2 and 3). All trucks are fitted with at least one battery 130, but many have more than one—often four.

Figure 2:
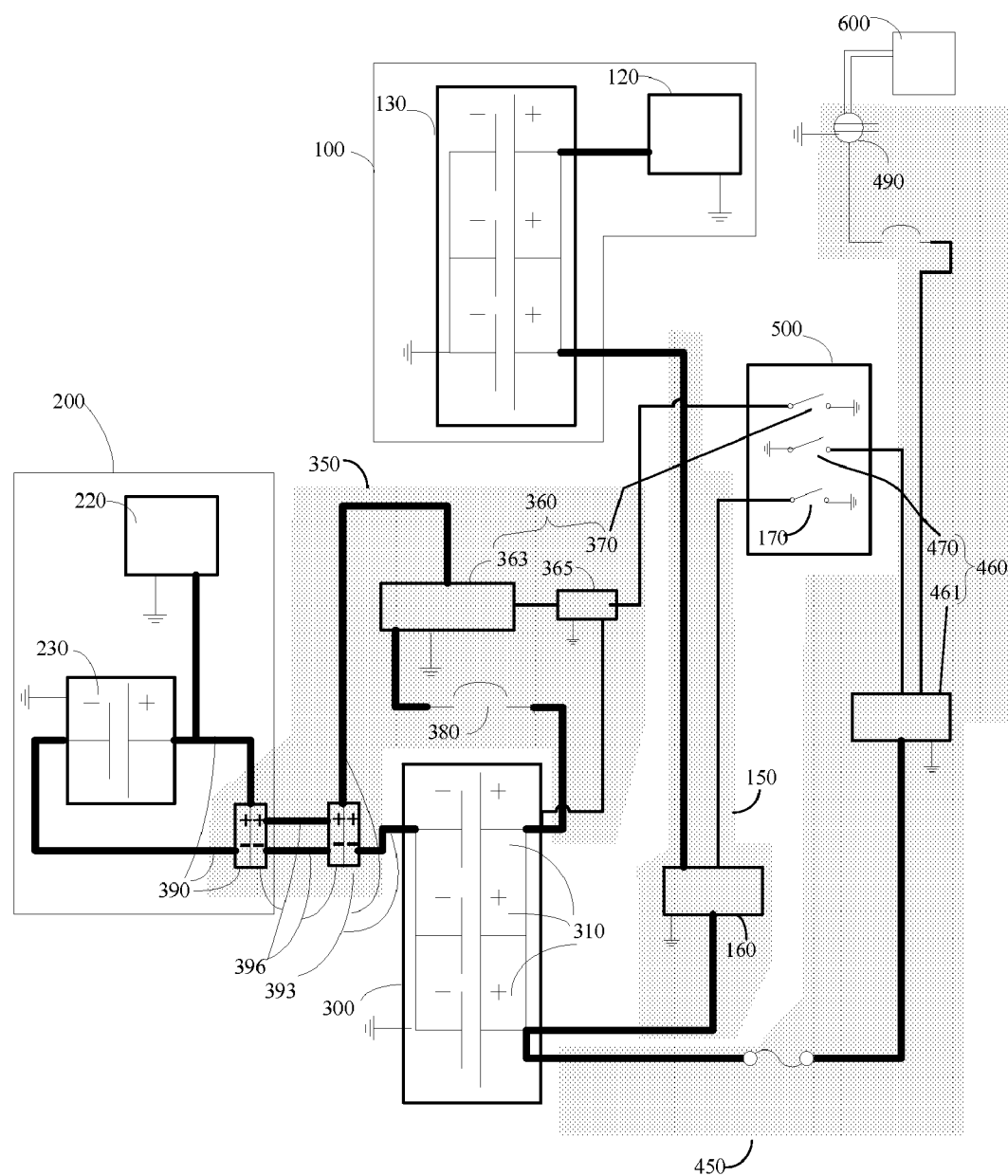
FIG. 2, shows a schematic diagram depicting a version of the electrical system of the present invention for the provision of DC current to electrical devices.
Figure 3:
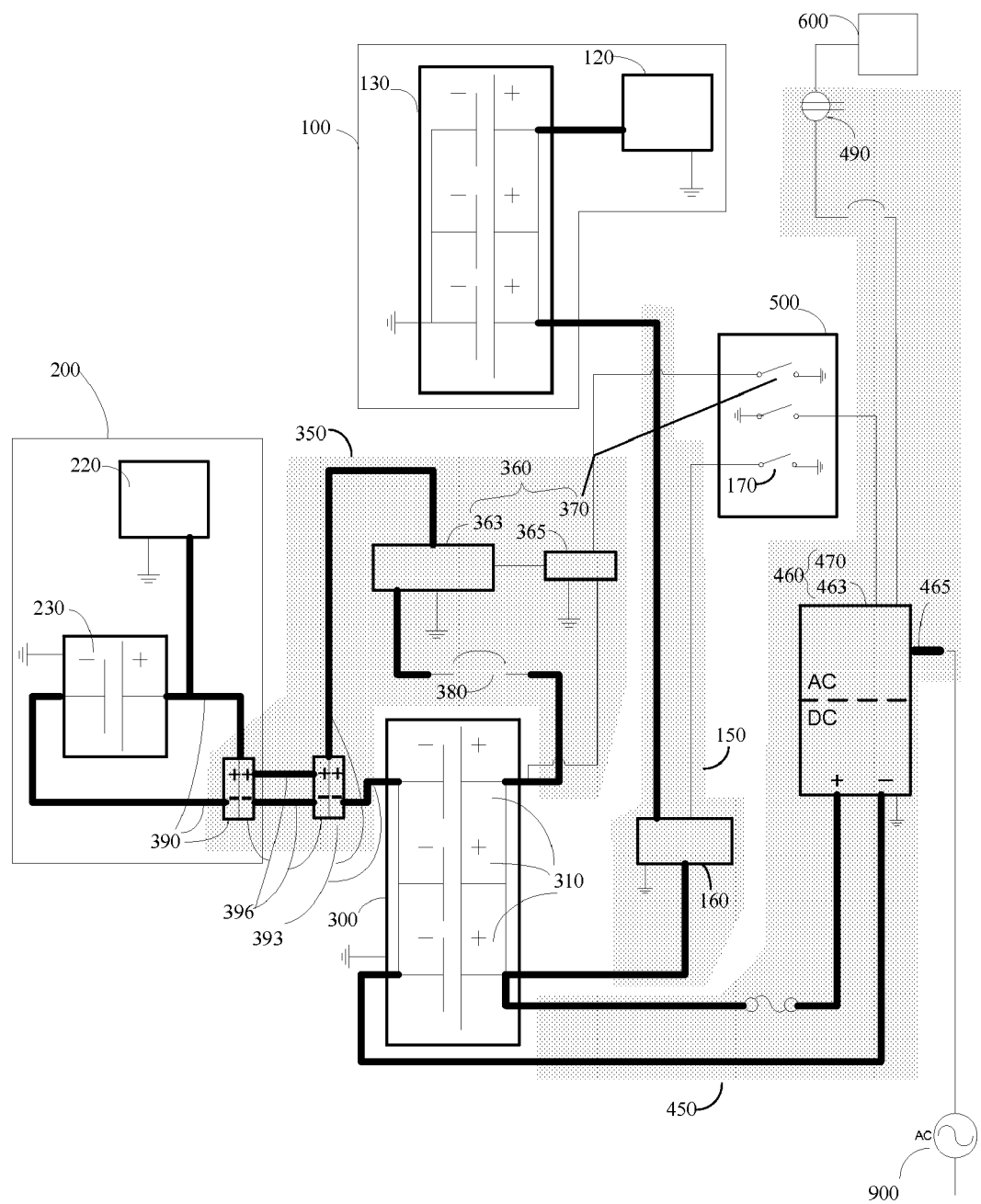
FIG. 3, shows a schematic diagram depicting a version of the electrical system of the present invention for the provision of AC current to electrical devices; and, FIG. 4, shows a version of the electrical system of the present invention in which a thermostat switch is incorporated into the second circuit.

Secondary power supply 200. The secondary power supply 200 may consist of almost any electrical power generating means from solar panels to portable generators mounted on the truck itself. Often the secondary power supply 200 employed in the system of the present invention will consist of a motorized unit on a trailer being hauled by the truck. For example, refrigerated trailers (a.k.a. reefers) have refrigeration units mounted on them which run on diesel fuel and maintain the temperature of the trailer. Other trailers may be specialized to maintain other conditions such as lighting or other electrical equipment while being hauled and will have electrical generation units of other sorts. In any event, the refrigeration or other electrical generation units 200 will generally consist of an alternator 220 in combination with one or more batteries 230 as depicted in FIGS. 2 and 3. These secondary power supplies 200 are being run anyway to maintain conditions in a trailer and the system of the present invention takes advantage of this by capturing some of the power to run electrical devices 600 in the truck and to maintain charge of the auxiliary storage means 300.

Auxiliary power device storage 300. The auxiliary power device storage 300 consists of one or more power storage units. In many cases the power storage units 310 will consist of batteries such as 12V deep cycle or other types of batteries such as hydrogen cells. Currently available deep cycle batteries work well with this system as they hold a higher voltage than do starter batteries, for example, and they can be drawn down to 9.5 V, hence their designation as "deep cycle." However, still other types of power storage means may be employed and will vary as the technology of energy storage evolves.

First operating circuit 150. The first operating circuit 150 connects the primary power supply 100 to the auxiliary power device storage 300 (see FIG. 1). It consist generally of a first switching mechanism 160 for actuating the first operating circuit 150 and for enabling an operator to, or to automatically, selectively close the first operating circuit 150 and to direct power from the primary power supply 100 to charge one or more power storage units 310 of the auxiliary power device storage 300 while the truck's engine is turned on.

The first switching mechanism 160 may be of any number of types individually or in combination such as mechanical switches or electrical switches (i.e., relays, including continuous duty relays). The first switching mechanism 160 may be located in the cab of the truck or elsewhere. The first switching mechanism 160 may further consist of a first remote switch 170 to enable an operator to activate the first switching mechanism 160 from another location (see FIGS. 2 and 3) such as the cab of the truck. The first remote switch 170 may be a toggle or other type of switch with an on and off position, and may be mounted on a switch panel 500 located within easy reach of an operator such as on the dashboard of the truck or other similarly handy location.

The first remote switch 170 may be manually or automatically activated. Automatic activation may occur, for example, whenever the truck's engine is running. In this case, the first circuit 150 will automatically be closed when the truck's engine is turned on, thus enabling the primary power supply 100 to charge the auxiliary power storage device 300. Likewise, the circuit 150 will open when the truck's engine is turned off, disconnecting the battery(ies) 130 from the auxiliary power storage device 300 and preventing depletion of the battery's charge.

Second operating circuit 350. The second operating circuit 350 connects the secondary power supply 200 to the auxiliary power storage device 300 (see FIG. 1) by means of a first, second and optionally also an intermediate connector. The first connector 390 consists of electrical cables (such as #2, two-wire cables) and polarized (i.e., one-way)plugs 390 attached to the positive and negative posts of the battery 230 of the secondary power supply 200 (see FIGS. 2 and 3). The connector/plugs may be of a fork-lift battery or other type. The second connector 393 consists of electrical cables (such as #2, two-wire cables) and polarized (i.e., one-way) connector/plugs attached to positive and negative posts on the auxiliary power storage device 300. The positive cable coming from the positive post on the auxiliary power storage device 300 first connects to the second switching mechanism 36O. A third intermediate connector 396 comprising a set of similar electrical cables and one-way connector/pugs may optionally also be used to interconnect the second connector 393 to the first connector 390, depending on the length of connection required in the particular circumstance. One-way connector/plugs are used as a safe way of assuring proper connection of the cables, however other types of connector/ plugs may also be utilized.

Additionally, the first and second connector 390 and 393 enable alternative access to the auxiliary power storage device 300 and secondary power supply 200 for other purposes such as jump-starting each other or another 12V vehicle or device (see below).

The secondary power supply 200 may also be connected to the primary power supply 100 when the first circuit 150 is closed simultaneous with the second circuit 350. In this situation, the secondary power supply 200 may be used to maintain charge of the truck's battery(ies) 130 in addition to maintaining charge of the auxiliary power storage units. This is particularly useful for running the truck's lights in the event of failure of the truck's alternator 120. When the first and second circuits 150 and 350 are connected in this way, either alternator 120 or 220 may be used in the event of an emergency when the other alternator is not functioning, to temporarily power both the primary and secondary power supplies 100 and 200 until repairs can be made. Additionally, the first and second connector 390 and 393 can be used to jump-start a 12 V battery (130, 230 or other) if need be.

The second operating circuit 350 consists of a first circuit breaker 380 and a second switching mechanism 360. The second switching mechanism 360 actuates the second operating circuit 350 and enables the automatic or manual selective closure of the second operating circuit 350 and directing of power from the secondary power supply 200 to charge the one or more power storage units 310 of the auxiliary power storage device 300 when the truck's engine is turned on or off.

The second switching mechanism 360 may be of any number of types individually or in combination such as mechanical switches or electrical switches (i.e. relays, including continuous duty relays). The second switching mechanism 360 may be located near the auxiliary power storage device 300 or elsewhere.

The second switching mechanism 360 may consist of one or more electrical switches of any number of types individually or in combination such as mechanical switches or electrical switches (i.e. relays, including continuous duty relays). Many configurations are possible for the second switching mechanism 360. For example, as depicted in FIGS. 2 and 3, the second switching mechanism 360 consists of a primary switch 363, a first control switch 365 and a second remote switch 370. The primary switch 363 actuates the second circuit 350. As depicted, the primary switch 363 is in turn controlled by the first control switch 365 which powers the primary switch 363. The first control switch 365 is, in turn, controlled by the second remote switch 370. The second remote switch 370 may be a lighted toggle switch or the like.

The primary switch 363 may be a continuous duty relay, continuous duty battery switch or the like and vary by amperage rating (e.g. 175 amp or other). The first control switch 365 supplies power to, and thus activates, the primary switch 363. The first control switch 365 may be a 30-amp relay, for example. The second remote switch 370 enables an operator to activate the second switching mechanism 360 from another location (see FIGS. 2 and 3). The second remote switch 370 may be a toggle or other type of switch with an on and off position, manually or automatically activated, and may be mounted on a switch panel 500 located within easy reach of an operator such as on the dashboard of the truck or other similarly handy location.

By using a first control switch 365 to activate the primary switch 363, very little amperage is needed at the switches 365 and 363 to power the system. The high-amperage switching in the second circuit 350 can be confined to one area such as near the auxiliary power storage device 300. The high-amperage cables or wires are thus kept short because the high amperage switching is limited to that one small area. Thus, only the longer lower amperage wires are run throughout the truck. Though alternative arrangements are possible, safety is maximized when high amperage cables and wires are restricted to a single area.

The circuit breaker 380 of the second operating circuit 350 is generally automatically resetting and sized proportionately to the alternator 220 of the secondary power supply 200—generally 10 amps less than the rated alternator 220 output. The circuit breaker 380 functions as one means of distributing the load so as to minimize stress on the secondary power supply 200. In so doing, the function of the circuit breaker 380 exceeds its normal function of safety by additionally keeping wear and tear on the secondary power supply 200 low. The circuit breaker 380 functions to ensure that the secondary power supply 200 charges the auxiliary power storage device 300 only when the current draw is acceptably low, that is, within acceptable parameters as defined by the amperage rating of the alternator 220 of the secondary power supply 200.

For example, if the alternator 220 of the secondary power supply 200 is rated at 45 amps, the circuit breaker 380 should be proportionately sized, such as a 40 amp automatically reseating circuit breaker. In this setup, if the third operating circuit 450 is open (see below) enabling electrical devices 600 to draw upon power stored in the auxiliary power storage device 300, and the second operating circuit 350 is simultaneously closed, the result will be a amperage draw across the circuit breaker 380. If the draw exceeds 40 amps, the circuit breaker 380 will open, breaking the second operating circuit 350 and the alternator 220 of the secondary power supply 200 will be maintaining its own battery(ies) 230 only.

In the typical operation of the present invention, electrical devices 600 will not use more than 28 amps, and that only for a few minutes after which the amperage draw drops to a level of around 5 to 15 amps. As the voltage charge of the auxiliary power storage device 300 is replenished, the amperage draw decreases. So, where the alternator 220 is rated at 40 amps, and therefore designed to put out 40 amps continually, there is never a problem with draw exceeding the amperage rating of the alternator 220. Alternator 220 failures are therefore highly unlikely. However, when high-voltage electrical appliances 600 are utilized (such as space-heaters or air conditioners) the second circuit 350 may further comprise temperature controls as described following.

Figure 4:
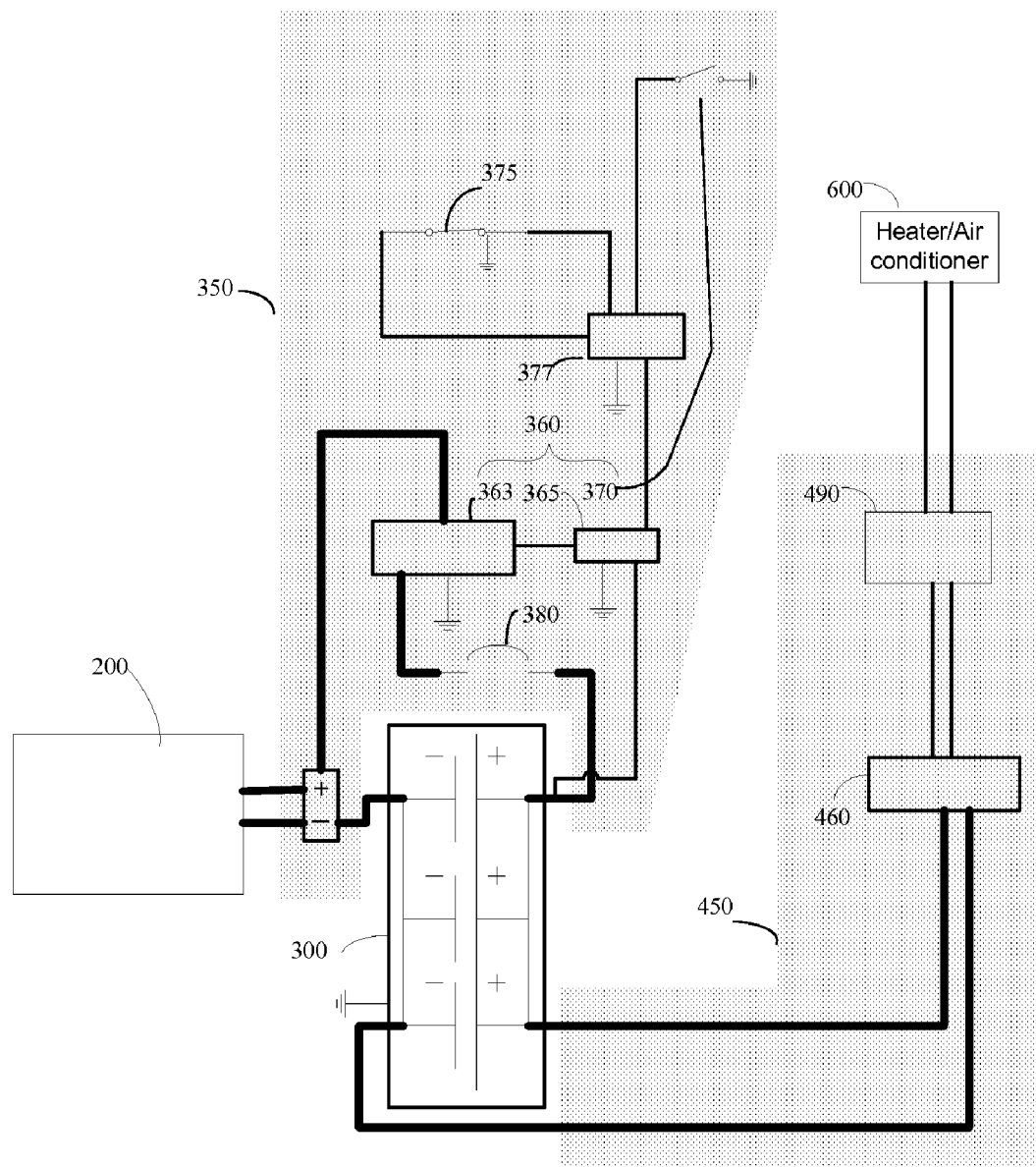

The second circuit 350 may further comprise a temperature controlled switch 375 such as a thermostat, thermorelay or other similar device (hereinafter "thermostat switch") powered by the truck's battery(ies) 130. This option is depicted in FIG. 4 showing the second and third circuits 350 and 450 only.

This option opens the second circuit 350, thus disconnecting the secondary power supply 200 from the auxiliary storage means 300, when high-amperage devices 600 such as heaters and air conditioners are powered on to heat or cool the interior of the truck. For example, a 1000 Watt space heater draws about 88 amps DC, normally draining the auxiliary power storage units 310 in little time. The alternator 220 of the secondary power supply 200, rated at about 40 amps would not be able to meet this demand. Most air conditioning units will draw less amperage than a space-heater, for example around 35 amps, and may therefore be supportable by a 40 amp alternator 220.

While the second circuit 350 is open, the devices draw down power stored in the auxiliary power storage device 300. Once the trigger temperature is reached, these thermostatically-controlled devices 600 power off and the second circuit 350 closes enabling the secondary power supply 200 to replenish the auxiliary power storage device 300. This temperature-controlled version of the second circuit 350 thus functions (in addition to the circuit breaker 380, see above) to ensure that the secondary power supply 200 charges the auxiliary power storage device 300 only when the current draw is acceptably low, that is, within acceptable parameters as defined by the amperage rating of the alternator 220 of the secondary power system 200.

In this temperature-controlled version of the second circuit 350, 12 V power from the second remote switch 370 runs through a second control switch 377. The second remote switch 370 is powered by the truck's battery(ies) 130. The second control switch 377 may be a 5-amp normally closed relay, for example, or other type of switch. In its normally closed position, the switch 377 transmits power from the second remote switch 370 to the first control switch 365, activating the primary switch 363 and closing the second circuit 350 as described above.

The 12V thermostat switch 375 is powered by the truck's battery(ies) 130 and is mounted in the truck's interior where the temperature is meant to be controlled (such as the bunk of the truck). When the truck's interior temperature requires heating or cooling, the thermostat switch 375 closes, opening the normally-closed second control switch 377. Thus, the second circuit 350 is opened between the secondary power supply 200 and the auxiliary power storage device 300. The electrical device 600 operates to return the interior temperature to the target temperature using power supplied from the auxiliary power storage device 300. The charge of the auxiliary power storage device 300 diminishes while the device 600 is operating, since it (300) is not being recharged by the secondary power supply 200 while the second circuit 350 is open.

When the target interior temperature is reached, the thermostat switch 375 opens, closing the second control switch 377 and thus closing the second circuit 350. The secondary power supply 200 resumes replenishment of the auxiliary power storage units 310 to full or nearly full charge.

The thermostat switch 375 may be configured to control the outlet 490 into which the heater or cooler 600 alone is plugged. In this way the thermostat switch 375 effectively turns the heater/cooler 600 on and off by controlling the power supply to its particular outlet 490.

The outside temperature will determine how long it takes to heat or cool the truck's interior and thus, the time during which the second circuit 350 will be opened or closed. Generally, however, the circuit 350 is closed and charging about 4 or more times longer than it is open. The auxiliary power storage device 300 is thereby replenished to full or nearly full level between periods of heating or cooling. For this reason, the temperature of a truck's interior may be kept at a comfortable level for relatively long periods of time during which the truck is off-road and its engine is turned off. The auxiliary power storage units 310 are given adequate time to recover charge and are not being drained constantly, ensuring a subsequent longer run time.

As a further option to the second circuit 350, it may further comprise a switching means at the secondary power supply 200, such as a continuous duty relay or other similar device. This switching means would be utilized to close the second circuit 350 when the secondary power supply 200 is running and open the circuit 350 when the power supply 200 is turned off. The switching means would thereby function to protect the battery 230 of the secondary power supply 200 from run down if the power supply 200 is turned off but the second remote switch 370 is in the on position, otherwise closing the second circuit 350.

This functionality would provide an advantage when the system of the present invention is used with secondary power supplies 200 that can operate in an automatic on/off mode (as can many refrigerated units, for example). An automatic on/off mode saves fuel by running the secondary power supply 200 only when needed to maintain specified conditions in the trailer. If a secondary power supply 200 is operating in an automatic on/off mode, it is available for charging the auxiliary power storage units 310 for less time, leading to a higher likelihood that the auxiliary power storage device 300 will not always be at full charge.

This situation is acceptable when weather conditions are such that heaters or coolers 600 are required to run less. For example, the energy demand for heating on a 45-degree F. night is less than on a 20-degree F. night. A driver would be able to determine whether to activate the secondary power supply's automatic on/off feature or not, depending on the weather conditions.

Third operating circuit 450. The third operating circuit 450 connects the auxiliary power storage device 300 to one or more electrical outlets 490 in the truck (see FIG. 1). Electrical devices 600 may be plugged into the outlets 490 and run off the power stored in the auxiliary power storage units 310 when the third circuit 450 is closed. The electrical devices may run off the power generated by the secondary power supply 200 when the second circuit 350 is simultaneously closed connecting the electrical devices 600 thereto via the third circuit 450.

The third operating circuit 450 consists of the one or more electrical outlets 490 and a third switching mechanism 460 for enabling the operator to, or to automatically, selectively close the third operating circuit 450 and direct power from the auxiliary power storage device 300 to the electrical outlet(s) 490.

The third switching mechanism 460 may be any number of types of switches alone or in combination such as mechanical or electrical switches (e.g., relays, continuous duty relays, or the like) and vary by amperage rating. Many configurations are possible for the third switching mechanism 460.

Referring to FIG. 2, one version of the third circuit 450 is depicted in which direct current (DC) is being supplied via the circuit 450 to the outlet(s) 490. Electrical devices 600 that run on DC may be powered by this version of circuit 450. The third switching mechanism 460 in this version, consists of a third remote switch 470 and a secondary switch 461. The third remote switch 470 enables an operator to manually activate the secondary switch 461. The third remote switch 470 may alternatively be automatic, and may or may not be mounted in a switch box 500 as depicted in FIG. 2.

Referring to FIG. 3, another version of the third operating circuit 450 is depicted in which the circuit 450 further consists of an inverter 463 and in which the third switching mechanism 460 consists of the inverter 463 and the third remote switch 470 which activates the inverter 463 thereby opening or closing the circuit 450 as the inverter is turned on or off the inverter 463 enables alternating current (AC) to be supplied to the outlet(s) 490. Switching the inverter 463 on closes the circuit, turning it off opens the circuit.

The inverter 463 functions to convert DC from the auxiliary power storage device 300 to AC subsequently supplied to the outlet(s) 490. The inverter 463 may be a power inverter or similar inverter device capable of converting DC to AC and vary by wattage. For example, a professional model such as a 2,000 watt inverter may be employed to provide ample AC for running electrical devices 600 to meet a driver's heating, cooling, cooking, computer and other needs. Inverters 463 such as this type model may come with battery chargers built in to enable charging of the auxiliary power storage units 310 whenever the inverter 463 is plugged into an external AC power supply 900 (see below). When the auxiliary power storage units 310 are deep cycle batteries, the battery charger of the inverter 463 may specifically be a deep cycle battery charger to ensure the proper charge of those batteries 310.

The inverter 463 may also include an AC plug 465 to enable use of external AC power supplies 900 (i.e., shore power) when available, to power the electrical devices 600 and to recharge the auxiliary power storage units. In this option, a driver need not draw upon the power stored in the auxiliary power storage device 300 to power the electrical devices 600, powering them instead from the external AC power supply 900 when available.

Generally, the inverter 463 will convert the 12V DC current from the auxiliary power storage device 300, to 110V AC to the outlet(s) 490. Depending on the inverter 463 and voltage requirements of the operator, alternative AC voltages (such as 120V or other) may be provided to the outlet(s) 490. By doing so, electrical devices 600 which run on AC may be powered. Since AC electrical appliances like space-heaters, air conditioners, cooking appliances, computers, radios, televisions and the like are much cheaper and more readily available than similar DC appliances, provision of AC to the outlet(s) 490 may provide significant economic advantages and improved options to the truck driver.

The Method

The method of the present invention employs the system as described above.

The secondary power supply 200 and the auxiliary power storage device 300 are removably connected by connecting the first and second connector 390 and 393. Recall that the first and second connector 390 and 393 comprise cables and connector/plugs. An operator may connect the first and second connector 390 and 393 by connecting their respective connector/plugs. These may be one-way connector/plugs in which case the operator can only connect them correctly, thus improving the safety of the system. There may also be employed a third intermediate connector 396, particularly in circumstances where the cables must traverse greater distances. In the event third connector 396 are employed, the operator connects the first connector 390 to one end of the third connector 396 and the second connector 393 to the other end. In this way, the first and second connector 390 and 393 are connected via the third intermediate connector 396.

If the operator wishes to employ the secondary power supply 200 while driving the truck, the secondary power supply 200 and auxiliary power storage device 300 may be connected by the above method prior to beginning a trip. Otherwise, the two (200 and 300) may be connected after the operator stops the truck.

Once the secondary power supply 200 is connected to the auxiliary power storage device 300, the secondary power supply 200 is turned on.

When the truck's engine is turned on, the first operating circuit 150 may be either automatically or manually actuated by means of the first remote switch 170, which in turn actuates the first switching mechanism 160. If manually actuated, the first remote switch 170 may be a toggle switch that an operator may flip to an on position, for example. Once actuated, power is directed from the primary power supply 100 to the at least one auxiliary power storage unit 310. When the truck's engine is turned off, the first operating circuit 150 may likewise be deactuated automatically or manually by means of first switching mechanism 160. If manually deactuated, the first remote toggle switch 170 may be flipped by the operator to an off position, for example.

The second operating circuit 350 is actuated when the truck's engine is turned off, and optionally also when it is turned on, by means of the second remote switch 370. By actuating the second operating circuit 350, power is directed from the secondary power supply 200 to the at least one auxiliary power storage unit 310 of the auxiliary power storage device 300. The operator may thus enable charging of the auxiliary power storage units 310 both when the truck's engine is turned off and when it is turned on.

After the truck's engine has been running for a short period of time with the first 150, and optionally second 350, circuit actuated, the auxiliary power storage units 310 will be fully charged. Therefore, when the truck's engine is turned off, the operator will have sufficient power stored in the auxiliary power storage units 310 to run electrical devices 600 within the truck. This will of course lead to depletion of the charge of the auxiliary power storage units 310 if the electrical devices 600 are run for longer periods of time. Since the operator will experience hours of off-road stops during which the truck's engine will be turned off, it is beneficial for the operator to actuate the second circuit 350 during off-road periods of time in order to maintain charge of the auxiliary power storage units 310.

For this reason, the operator will actuate the second circuit 350 (or leave it actuated if it was so while the truck's engine was turned on) upon turning the truck's engine off. The operator will also actuate the third operating circuit 450 (or leave it actuated if it was so while the truck's engine was turned on) to direct power from the auxiliary power storage device 300 to the one or more electrical outlets 490 in the truck. With both the second and third circuits 350 and 450 actuated, the secondary power supply 200 supplies power to the electrical outlets 490 to power any electrical devices 600 plugged in. If the auxiliary power storage units 310 are partially depleted in charge, the secondary power supply 200 will also function to replenish their charge. The operator may run electrical devices 600 to heat or cool the truck's cab and bunk areas, and to operate other electrical devices 600 such as cooking equipment, radio, television, computer, lights or the like.

If the current draw by the electrical devices 600 across the first circuit breaker 380 exceeds its amperage rating, the circuit breaker 380 will open the second circuit 350, thus disconnecting the secondary power supply 200 and protecting it (including its alternator 220) from damage or undue stress.

In addition to the circuit breaker 380, if the thermostat switch 375 is installed (see FIG. 4), it too will function to break the second circuit 350 in the event that a high-amperage electrical device 600 such as a space heater is being used to maintain the interior temperature of the truck.

When the third operating circuit 450 further consists of an inverter 463 as described above, it will convert direct current (DC) from the secondary power supply 200 and/or auxiliary storage units 310 to alternating current (AC) enabling the operator to use electrical devices 600 that run on AC. If the inverter 463 furthermore has a plug 465, the operator may plug the inverter 463 into an external AC power supply 900 and power the electrical devices 600 from the power supply 900 rather than from the secondary power supply 200 or auxiliary power storage units 310. In addition, if the inverter 463 also has a battery charger, the external AC power supply 900 may be used to recharge the auxiliary power storage units 310.

By providing first, second and third remote switching means 170, 370 and 470, the operator may selectively actuate any single circuit 150, 350 or 450, or any combination of the three. This provides the operator with the ability to accommodate a wide variety of needs that may be encountered on or off the road. In addition to the normal operations as described above, the first and second circuits 150 and 350 may be opened to enable use of either the primary or secondary power supply 100 or 200 to power the other. One or the other power supply 100 or 200 may likewise be used to power the other in the event that one of the alternators 120 or 220 has failed. In an emergency situation like this, sufficient power would be available from the functioning supply 100 or 200 to power the non-functioning unit for a short period of time sufficient to maintain emergency lighting or to drive the truck to a repair station. Using the connector 390 and/or 393, the operator may use either power supply 100 or 200 to jump-start the other or another 12V device. As the reader can see, the operator may use various of the circuits alone or in combination to gain a wide variety of capabilities.

Advantages

The previously described versions of the present invention have many advantages, including the provision of:

means by which already produced power may be safely and efficiently captured for use to power electrical devices in a truck while the truck's engine is turned off, to enable a driver to heat and cool the truck's cab and bunk areas and to run other electrical appliances while simultaneously conserving fuel, decreasing pollution (including noise and exhaust), decreasing engine wear, and saving money.

means by which power already being produced by a truck's primary power supply may be captured and stored in an auxiliary power storage device while the truck's engine is turned on, for later use to power electrical devices in the truck while the truck's engine is turned off;

means by which power already being produced by a secondary power supply on a trailer being hauled by the truck may be safely captured and stored in an auxiliary power storage device while the truck's engine is on or off, for later use to power electrical devices in the truck while the truck's engine is turned off;

means by which a secondary power supply may be safely used to maintain charge of an auxiliary power storage device over extended periods of time while the truck's engine is turned off, regardless of current draw by electrical devices in the truck, eliminating the need for large battery banks and thus reducing the weight of the auxiliary power storage device needed; and, means by which the power from the auxiliary power storage device may optionally be provided in alternating current to power electrical devices in the truck, to enable a driver to use electrical devices that are more readily available and cheaper than those that run on direct current.

The present invention does not require that all the advantageous features and all the advantages need to be incorporated into every embodiment thereof.

Closing

Although the present invention has been described in considerable detail with reference to certain preferred versions thereof, other versions are possible. Therefore, the spirit and scope of the appended claims should not be limited to the description of the preferred versions contained herein.

What is claimed is:

1. A system for powering an at least one electrical device in a truck with an engine while the truck's engine is turned off, the system comprising:

a primary power supply comprising an alternator and an at least one battery of the truck;

a secondary power supply;

an auxiliary power storage means for storing power comprising an at least one auxiliary power storage unit;

a first operating circuit connecting the primary power supply to the auxiliary power storage means, comprising a first switching means for selectively actuating the first operating circuit to direct power from the primary power supply to charge the at least one power storage unit of the auxiliary power storage means while the truck's engine is turned on;

a second operating circuit connecting the secondary power supply to the auxiliary power storage means, comprising a first circuit breaker;

a second switching means for selectively actuating the second operating circuit to direct power from the secondary power supply to charge the at least one power storage unit of the auxiliary power storage means; and, a third operating circuit connecting the auxiliary power storage means to an at least one electrical outlet in the truck, comprising the at least one electrical outlet into which the at least one electrical device may be plugged; and, a third switching means for selectively actuating the third operating circuit to direct power from the auxiliary power storage means to the at least one electrical outlet;

wherein a system is provided to safely and efficiently capture power being generated by the primary and secondary power supplies, to store the captured power in the auxiliary power storage means, and to maintain the charge of the at least one auxiliary power storage units by using the secondary power supply when the primary power supply is turned off so as to enable the at least one electrical device to run on power generated by the secondary power supply or stored in the at least one auxiliary power storage unit over an extended period of time while the truck is turned off without depleting the charge of the at least one auxiliary power storage unit and while minimizing stress on the secondary power supply.

2. The system of claim 1, wherein the secondary power supply is a powered refrigeration unit mounted on a trailer being hauled by the truck.

3. The system of claim 1, wherein the second switching means of the second circuit comprises:
   a primary switching means for actuating the second operating circuit;
   a first control switch operatively interconnected with the primary switching means for actuating the primary switching means; and,
   a remote switch operatively interconnected with the first control switch for selectively actuating the first control switch and thereby the primary switching means to actuate the second operating circuit.

4. The system of claim 1, wherein the third operating circuit further comprises an inverter means operatively interconnected with the auxiliary power storage means and the at least one electrical outlet for converting direct current from the auxiliary power storage means to alternating current.

5. A system for powering an at least one electrical device in a truck with an engine while the truck's engine is turned off, the system comprising:
   a primary power supply comprising an alternator and an at least one battery of the truck;
   a secondary power supply located on a trailer being hauled by the truck and comprising an alternator and an at least one battery;
   an auxiliary power storage means for storing power comprising an at least one auxiliary power storage unit;
   a first operating circuit operatively connecting the primary power supply to the auxiliary power storage means, comprising
      a first switching means for actuating the first operating circuit to direct power from the primary power supply to charge the at least one power storage unit of the auxiliary power storage means while the truck's engine is turned on; and
      a first remote switch operatively interconnected with the first switching means for selectively actuating the first switching means;
   a second operating circuit connecting the secondary power supply to the auxiliary power storage means, comprising
      a first connecting means connected to the at least one battery of the secondary power supply for connecting the secondary power supply to the auxiliary power storage means via a second connecting means to which the first connecting means is removably connected;
      the second connecting means connected to the auxiliary power storage means for connecting the auxiliary power storage means to the secondary power supply via the first connecting means to which the second connecting means is removably connected;
      a first circuit breaker located between the secondary power supply and the auxiliary power supply, the first circuit breaker having a trip amperage less than the rated amperage output of the alternator of the secondary power supply;
      a second switching means for selectively actuating the second operating circuit to direct power from the secondary power supply to charge the at least one power storage unit of the auxiliary power storage means, comprising
         a primary switching means for actuating the second operating circuit;
         a first control switch operatively interconnected with the primary switching means for actuating the primary switching means; and,
         a second remote switch operatively interconnected with the first control switch for selectively actuating the first control switch and thereby the primary switching means to actuate the second operating circuit; and,
   a third operating circuit connecting the auxiliary power storage means to an at least one electrical outlet in the truck, comprising
      a second circuit breaker;
      the at least one electrical outlet into which the at least one electrical device may be plugged; and,
      a third remote switch for selectively actuating the third operating circuit to direct power from the auxiliary power storage means to the at least one electrical outlet;
   wherein a system is provided to safely and efficiently capture power being generated by the primary and secondary power supplies, to store the captured power in the auxiliary power storage means, and to maintain the charge of the at least one auxiliary power storage units by using the secondary power supply when the primary power supply is turned off so as to enable the at least one electrical device to run on power generated by the secondary power supply or stored in the at least one auxiliary power storage unit over an extended period of time while the truck is turned off without depleting the charge of the at least one auxiliary power storage unit and while minimizing stress on the secondary power supply.

6. The system of claim 5, wherein the secondary power supply is a powered refrigeration unit mounted on the trailer.

7. The system of claim 5, wherein the first and second connecting means each comprise a pair of electrical cables one end of each connecting to the secondary power supply and the auxiliary power storage means, respectively, and the other end of each comprising a one-way connector to enable a removable connection there between.

8. The system of claim 5, wherein the second operating circuit further comprises a third connecting means inserted between and removably connecting the first and second connecting means.

9. The system of claim 5, wherein the at least one electrical device is a device that operates on direct current.

10. The system of claim 5, wherein the third operating circuit further comprises an inverter means operatively interconnected with the auxiliary power storage means and the at least one electrical outlet for converting direct current from the auxiliary power storage means to alternating current and wherein the at least one electrical device is a device that operates on alternating current.

11. The system of claim 10, wherein the inverter means comprises an electrical plug to enable input of power from an external alternating current power supply.

12. A method for powering an at least one electrical device in a truck with an engine while the truck's engine is turned off, the method comprising:
providing a primary power supply comprising an alternator and an at least one battery of the truck;
providing a secondary power supply located on a trailer being hauled by the truck and comprising an alternator and an at least one battery;
providing an auxiliary power storage means for storing power comprising an at least one auxiliary power storage unit;
providing a first operating circuit operatively connecting the primary power supply to the auxiliary power storage means, comprising
a first switching means for actuating the first operating circuit to direct power from the primary power supply to charge the at least one power storage unit of the auxiliary power storage means while the truck's engine is turned on; and
a first remote switch operatively interconnected with the first switching means for selectively actuating the first switching means;
providing a second operating circuit connecting the secondary power supply to the auxiliary power storage means, comprising
a first connecting means connected to the at least one battery of the secondary power supply for connecting the secondary power supply to the auxiliary power storage means via a second connecting means to which the first connecting means is removably connected;
the second connecting means connected to the auxiliary power storage means for connecting the auxiliary power storage means to the secondary power supply via the first connecting means to which the second connecting means is removably connected;
a first circuit breaker located between the secondary power supply and the auxiliary power supply, the first circuit breaker having a trip amperage less than the rated amperage output of the alternator of the secondary power supply;
a second switching means for selectively actuating the second operating circuit to direct power from the secondary power supply to charge the at least one power storage unit of the auxiliary power storage means, comprising
a primary switching means for actuating the second operating circuit;
a first control switch operatively interconnected with the primary switching means for actuating the primary switching means; and,
a second remote switch operatively interconnected with the first control switch for selectively actuating the first control switch and thereby the primary switching means to actuate the second operating circuit;
providing a third operating circuit connecting the auxiliary power storage means to an at least one electrical outlet in the truck, comprising
a second circuit breaker;
the at least one electrical outlet into which the at least one electrical device is plugged; and,
a third remote switch for selectively actuating the third operating circuit to direct power from the auxiliary power storage means to the at least one electrical outlet;
removably connecting the first and second connecting means;
turning on the secondary power supply;
actuating the first operating circuit by means of the first remote switch when the truck's engine is turned on to direct power from the primary power supply to the at least one auxiliary power storage unit and deactuating the first operating circuit when the truck's engine is turned off;
selectively actuating the second operating circuit by means of the second remote switch to direct power from the secondary power supply to the at least one auxiliary power storage unit; and,
selectively actuating the third operating circuit by means of the third remote switch, to direct power to the at least one electrical outlet from the auxiliary power storage means and the secondary power supply;
whereby a method is provided for safely and efficiently capturing power being generated by the primary and secondary power supplies, for storing the captured power in the auxiliary power storage means, and for maintaining the charge of the at least one auxiliary power storage units by using the secondary power supply when the primary power supply is turned off so as to enable the at least one electrical device to run on power generated by the secondary power supply or stored in the at least one auxiliary power storage unit over an extended period of time while the truck is turned off without depleting the charge of the at least one auxiliary power storage unit and while minimizing stress on the secondary power supply.

13. The method of claim 12, further comprising providing a third connecting means in the second circuit inserted between and removably connecting the first and second connecting means, and wherein removably connecting the first and second connecting means further comprises removably inserting the third connecting means there between so that the first and second connecting means are connected via the third intermediate connecting means.

14. The method of claim 12, wherein the third operating circuit further comprises an inverter means operatively interconnected with the auxiliary power storage means and the at least one electrical outlet for converting direct current from the auxiliary power storage means to alternating current and wherein the at least one electrical device is a device that operates on alternating current.

15. The method of claim 12, wherein the inverter means comprises an electrical plug to enable input of power from an external alternating current power supply.

16. The method of claim 15, further comprising connecting the electrical plug to the external alternating current power supply.

* * * * *